United States Patent
Walker et al.

(10) Patent No.: US 7,285,257 B2
(45) Date of Patent: Oct. 23, 2007

(54) METHOD OF REMOVING TAR-FORMING GASES FROM CVD/CVI FURNACE EFFLUENT

(75) Inventors: Terence B. Walker, South Bend, IN (US); Craig B. Shumaker, Newark, DE (US)

(73) Assignee: Honeywell International Inc., Morristown, NJ (US)

( * ) Notice: Subject to any disclaimer, the term of this patent is extended or adjusted under 35 U.S.C. 154(b) by 634 days.

(21) Appl. No.: 10/832,672

(22) Filed: Apr. 27, 2004

(65) Prior Publication Data

US 2005/0238564 A1    Oct. 27, 2005

(51) Int. Cl.
*B01D 53/72* (2006.01)
*C01B 31/30* (2006.01)

(52) U.S. Cl. .............. 423/245.1; 423/245.3; 423/439; 75/444

(58) Field of Classification Search ............ 423/245.1, 423/245.3, 439; 75/444, 507, 445
See application file for complete search history.

(56) References Cited

U.S. PATENT DOCUMENTS

| | | | |
|---|---|---|---|
| 5,064,174 A | 11/1991 | Lehto et al. | |
| 5,137,566 A * | 8/1992 | Stephens et al. | 75/507 |
| 5,171,560 A | 12/1992 | Tennent | |
| 5,695,130 A | 12/1997 | Csendes | |
| 5,858,060 A * | 1/1999 | Ruer | 75/566 |
| 6,063,155 A | 5/2000 | Masso et al. | |
| 6,270,741 B1 | 8/2001 | Inoue et al. | |
| 6,328,946 B1 | 12/2001 | Stephens et al. | |
| 6,428,763 B1 | 8/2002 | Stephens et al. | |
| 6,474,067 B2 | 11/2002 | Shishido et al. | |
| 6,599,374 B1 * | 7/2003 | Hirsch et al. | 148/209 |
| 2002/0197534 A1 * | 12/2002 | Fukuda et al. | 429/231.4 |
| 2005/0163929 A1 * | 7/2005 | Delperier et al. | 427/249.1 |
| 2006/0180961 A1 * | 8/2006 | Poor et al. | 266/81 |

* cited by examiner

*Primary Examiner*—Ngoc-Yen Nguyen
(74) *Attorney, Agent, or Firm*—Birch, Stewart, Kolasch & Birch, LLP

(57) ABSTRACT

Method for removing tar-forming hydrocarbons from an effluent gas mixtures from Chemical Vapor Deposition or Chemical Vapor Infiltration processes. Method includes passing at elevated temperature effluent gas mixture containing hydrogen, methane, and high molecular weight hydrocarbons through a bed that contains iron pellets, thereby decomposing tar-forming high molecular weight hydrocarbons in the effluent gas mixture. Apparatus including a de-tarring vessel (5) having a packed bed (7, 8, 9) of iron or iron oxide pellets (1) resting over a perforated distributor plate (2) and having an exhaust port (12), said de-tarring vessel being operatively linked via an exhaust port (6) to a CVI or CVD reactor vessel.

15 Claims, 3 Drawing Sheets

METHOD OF REMOVING TAR-FORMING GASES FROM CVD/CVI FURNACE EFFLUENT

FIELD OF THE INVENTION

This invention relates to the production of iron carbide by making use of effluent gas mixtures from industrial processes such as those known as Chemical Vapor Infiltration and Chemical Vapor Deposition. In this process, effluent gases containing hydrogen, methane, and high molecular weight hydrocarbons are passed through a bed that contains iron pellets at an elevated temperature in order to convert a portion of the iron in the pellets into iron carbide and to remove tar-forming high molecular weight hydrocarbons from the gas mixture.

BACKGROUND OF THE INVENTION

The manufacture of carbon-carbon products, in particular aircraft brakes, involves the deposition of carbon from the decomposition of hydrocarbon gases at high temperatures (e.g., about 1000° C.) and low pressures (e.g., about 0.01 atm absolute). Typically, the hydrocarbon gas is primarily methane. To enhance deposition rates, however, small amounts of heavier hydrocarbon gases are commonly included in the process.

The deposition of carbon in the manufacture of carbon-carbon composites is generally accomplished by Chemical Vapor Infiltration (CVI) or Chemical Vapor Deposition (CVD). For the purposes of the present invention, those processes may be regarded as interchangeable. Gas phase intermediates are formed from methane in these processes. Those skilled in the art generally agree that the gas phase intermediates formed from methane are acetylene, benzene, and naphthalene, e.g., by the reaction

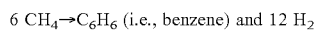

$$6\ CH_4 \rightarrow C_6H_6\ (\text{i.e., benzene})\ \text{and}\ 12\ H_2$$

Kinetic studies indicate that acetylene is formed first, then acetylene molecules combine to form benzene, and finally naphthalene is formed. The cyclic hydrocarbon molecules, benzene and naphthalene, are the precursors for carbon deposition. In the effluent gas, they act as tar formers. They continue to react and grow into higher molecular weight species that deposit on surfaces in the downstream gas processing equipment. Such tars represent a great expense in terms of vacuum pump maintenance, hazardous waste disposal, and so on. Tar traps have proven to be inefficient, and in any case do not solve the hazardous waste disposal problem. Moreover, even when tar traps are employed, there are still enough heavy hydrocarbons in the effluent gas to cause problems with pumps and combustion turbines, etc.

PRIOR ART. U.S. Pat. No. 6,270,741 B1 refers to a conventional method for producing iron carbide, in which fine-sized iron ore is charged into a fluidized bed reactor and reacted with a gas mixture that includes a reducing gas such as hydrogen and a carburizing gas such as methane. This reduces and carburizes iron oxides such as hematite ($Fe_2O_3$) and magnetite ($Fe_3O_4$) in a single process. For example, $3Fe_2O_3 + 5\ H_2 + 2CH_4 \rightarrow 2Fe_3C + 9\ H_2O$. U.S. Pat. No. 6,328,946 B1 discloses a two-step process for producing iron carbide. In the first step, a feed material containing iron materials is contacted with a gas that contains hydrogen to produce an intermediate product containing metallic iron. In the second step, the intermediate product is contacted with a gas that includes (a) carbon monoxide and/or carbon dioxide and (b) hydrogen and optionally (c) methane. U.S. Pat. No. 6,428,763 B1 discloses a two-step process for producing iron carbide from an iron oxide-containing feed material. In the first step, a feed material containing iron oxide is converted to an intermediate product by contact with a reducing gas, and in the second step (carburization) step, the metallic iron intermediate is converted into an iron carbide product. The carburizing gas preferably contains no more than about 5 mole-% carbon dioxide, no more than about 15 mole-% methane, no more than about 10 mole-% water vapor, and no more than about 10 mole-% inert gases.

SUMMARY OF THE INVENTION

This invention removes tar forming gases from CVD/CVI furnace effluent gas streams by passing said gas though packed beds of iron oxide or metallic iron to produce iron carbide. In addition to solving a major processing problem (that is, tar in the effluent gases), this invention produces a useful commodity (iron carbide) as a by-product. Iron carbide may be used, for instance, as a starting material in the manufacture of steel in mini-steel mills.

One aspect of the present invention is a process for removing tar-forming hydrocarbons from an effluent gas mixture. This process comprises the step of passing at an elevated temperature (e.g., 400-1100° C., preferably about 600° C.) an effluent gas mixture containing hydrogen, methane, and high molecular weight hydrocarbons, through a bed that contains iron pellets, thereby decomposing tar-forming high molecular weight hydrocarbons in said gas mixture. The effluent gas mixture is an effluent from a Chemical Vapor Deposition (CVD) process or from a Chemical Vapor Infiltration (CVI) process, such as a CVD or CVI process that deposits carbon in a fibrous matrix comprising, for instance, pitch and/or polyacrylonitrile derived carbon fibers. The gas mixture may contain 25 or less weight-% hydrogen, 50 or less weight-% methane, and 3 to 30 weight-% tar-forming high molecular weight hydrocarbons, and a ratio of hydrogen gas to carbon in the gas mixture may range from 2:1 through 5:1. It is most preferred that the carbonized fibrous matrix is a carbon-carbon composite configured as an aircraft brake disc.

The iron pellets used in the process of this invention generally comprise iron oxide or metallic iron. The diameters of the iron pellets range from 1 to 10 centimeters, preferably from 1 to 4 centimeters.

The process of this invention may include a further step of passing, at a similar elevated temperature, the gas mixture in which tar-forming high molecular weight hydrocarbons have been decomposed through a second bed that contains iron pellets, thereby decomposing tar-forming high molecular weight hydrocarbons remaining in said gas mixture. In one variant of this aspect of the invention, the first bed may be located inside the CVI reactor, between the carbon-carbon working zone and the exhaust port.

Another aspect of the present invention is an apparatus for de-tarring effluent gases from a Chemical Vapor Deposition or Chemical Vapor Infiltration process. This apparatus includes a de-tarring vessel comprising a packed bed of iron or iron oxide pellets resting over a perforated distributor plate and having an exhaust port. The de-tarring vessel is operatively linked via an exhaust port to a CVI or CVD reactor vessel. The apparatus may also include a baffle plate and/or a weir. The CVI or CVD reactor vessel portion of the apparatus may include water-cooled jacketing and exhaust port insulation.

Yet another aspect of the present invention is a method of fueling a gas turbine which comprises the steps of: carrying out a CVD or CVI process, for instance as a step in the manufacture of an aircraft brake disc; directing effluent gas from said process through an iron oxide pellet bed, wherein said effluent gas is passed through said bed at an elevated temperature and wherein a portion of the iron in said pellets is converted into iron carbide; leading a gas mixture which has passed through said bed into a fuel supply inlet of a gas turbine.

Finally, this invention provides a process for the production of iron carbide which comprises the step of passing a CVD/CVI effluent gas mixture containing hydrogen, methane, and high molecular weight hydrocarbons through a bed that contains iron pellets at an elevated temperature in order to convert a portion of the iron in said pellets into iron carbide while removing tar-forming high molecular weight hydrocarbons from said gas mixture.

BRIEF DESCRIPTION OF THE DRAWINGS

Various objects and features of the present invention will become apparent form the detailed description hereinbelow, considered in conjunction with the accompanying drawings. It is to be understood, however, that the drawings are designed solely for purposes of illustration and not as a definition of the limits of the invention. It should be further understood that the drawings are not necessarily drawn to scale and that, unless otherwise indicated, they are merely intended to conceptually illustrate the structures and procedures described herein.

DETAILED DESCRIPTION OF THE INVENTION

The "tar forming gas species" or "tar formers" referred to in this application include acetylene, benzene, and naphthalene. The removal of tar formers from the effluent gas stream is referred to herein as "de-tarring". Iron ore and iron oxide may be used interchangeably in this invention. Iron ore pellets typically contain 95 weight-% iron oxide ($Fe_2O_3$) and 5 weight-% gangue. "Gangue" is the non-valuable minerals or rock associated with an ore, in this case, primarily silica and alumina. Gangue is inert under the processing conditions of this invention.

The chemical reactions that produce iron carbide from iron oxide and the hydrocarbon gases in an effluent gas stream from a CVD/CVI reactor in accordance with this invention are:

$$3Fe_2O_3+11CH_4 \rightarrow 2Fe_3C+9CO+22H_2$$

$$6Fe_2O_3+11C_2H_2 \rightarrow 4Fe_3C+18CO+11H_2$$

$$18Fe_2O_3+11C_6H_6 \rightarrow 12Fe_3C+54CO+33H_2$$

$$30Fe_2O_3+11C_{10}H_8 \rightarrow 20Fe_3C+90CO+44H_2$$

Directly reduced iron ore pellets or sponge iron can be used to strip tar formers in accordance with this invention also. This reaction is:

$$3xFe+C_xH_y \rightarrow xFe_3C+y/2H_2$$

where, for a tar forming species, x is greater than or equal to y. Complete removal of carbon containing gases from the gas stream produces a pure gas stream of hydrogen that can be used in the "hydrogen economy". Or, the hydrogen can be used to reduce iron oxides to produce the metallic iron used in the above reaction. In that case, the ratio of total hydrogen-containing gases to carbon-containing gases leaving the CVD/CVI furnace must be 4.5 to 1, as determined by the stoichiometry of:

$$3Fe_2O_3+2C+9H_2 \rightarrow 2Fe_3C+9H_2O$$

where C is the total carbon in effluent gases as hydrocarbons and $H_2$ is the total hydrogen as hydrocarbons and hydrogen. This embodiment yields only iron carbide and water as products, and no combustible gases for power generation.

Figure 1:
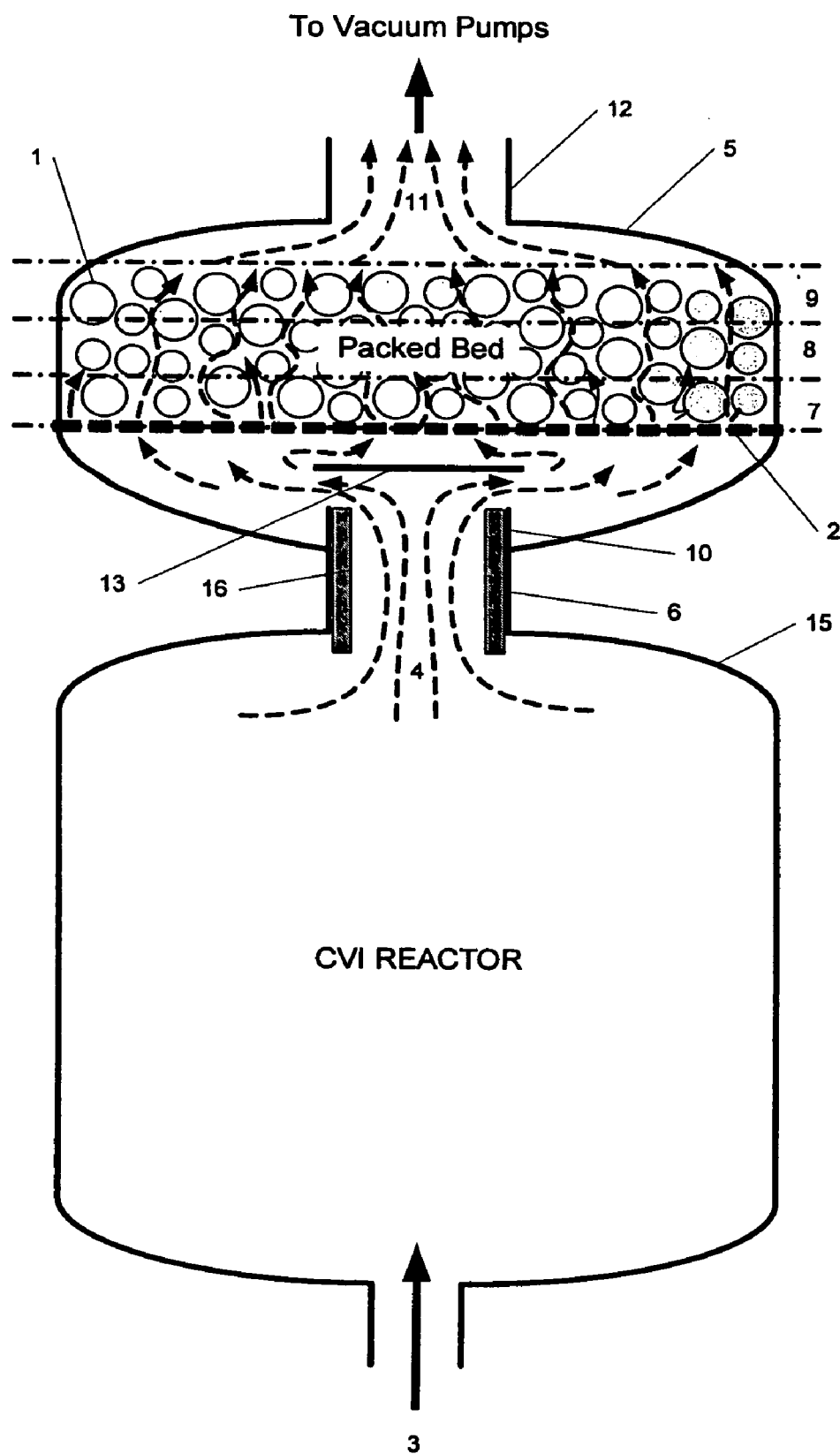
FIG. 1 is a cutaway side view illustrating the apparatus of this invention.

FIG. 1 reference numerals 1 iron or iron oxide pellet
2 perforated distributor plate
3 gases to be used for CVI processing
4 gases that have been used for CVI processing
5 de-tarring vessel
6 CVI exhaust port
7 lower portion of packed bed
8 central portion of packed bed
9 upper portion of packed bed
10 weir
11 gases that have been de-tarred
12 de-tarring vessel exhaust port
13 baffle plate
14 water-cooled jacketing
15 insulation.

FIG. 1. FIG. 1 is a cross-sectional schematic view which illustrates a chemical vapor infiltration reactor, is modified to force the effluent gas 4 which contains tar-forming species to pass through a packed bed of iron ore and/or iron oxide and/or metallic iron. Conventional CVI reactors produce carbon-carbon products by rapidly passing natural gas and/or other hydrocarbon gases 3 through an electrically heated hot zone. Some of the carbon in the incoming gas ends up being deposited within the carbon fiber preform matrices located in the CVI reactor. The effluent gas therefore (still) contains methane, hydrogen, and tar formers.

De-tarring vessel 5 may be fabricated from steel and may be refractory-lined for thermal insulation. The de-tarring vessel is mounted close to the CVI reactor to lessen the time for the gases to reach the bed to minimize cooling and gas-phase reaction time. The packed bed of iron ore is supported by a distributor plate 2 with holes or openings that allow the passage of gas. The effluent gases 4 pass through the packed bed and exhaust through port 12. Gas process stream 11 is constituted by effluent gases 4 after they have been stripped of tar-forming gas species. Schematic slip streams for gases flowing into, through and out of the de-tarring vessel are shown with dashed-line arrows in FIG. 1.

If iron dust were to fall into the CVI reactor, the quality of the carbon deposition process would be jeopardized. To prevent iron-containing material from falling back into the reactor, a baffle plate 13 and a weir 10 are situated near the exhaust port form the CVD reactor. It is important also that the design of CVI exhaust port 6 prevents the back-diffusion of carbon monoxide into the CVI reactor. This may be done in two ways. One is to maximize the linear velocity in the exhaust port by minimizing the diameter of the exhaust port. The second is to make the length of the exhaust port as long as possible. Together, these two design parameters permit the exhaust gas to overpower the molecular diffusivity of carbon monoxide in hydrogen and methane. A conflicting criterion is that these design parameters increase the pressure drop.

Conventionally, CVI reactors have water-cooled shells 15, including their exhaust ports 6. Preferably, the gas path from the working hot zone should be insulated, so as not to cool the gas effluent 4. In FIG. 1, this insulation is identified by reference numeral 16. Heat may be supplied to the packed bed to facilitate the reduction and carbiding of the iron. Operable temperatures are those for conventional gaseous iron ore reduction processes. Temperatures ranging from 400° C. to 1100° C. may conveniently be used, with temperatures of approximately 600° C. being currently preferred.

Because the CVI system operates under a vacuum maintained by downstream pumps, the pressure drop across the packed bed and distributor plate must be less than the operating pressure required in the CVI reactor. The pressure drop should preferably be less than about 2 torr. The de-tarring vessel may be operated between 0.001 atm to about 1 atm, depending on the operating pressure of the CVI reactor. There are three convenient ways to achieve a low pressure drop. One is the use of large diameter pellets. Large pellets reduce the amount of frictional force that the fluid exerts on the surface of the pellets. Pellet diameters of 1 to 10 centimeters are preferred, with pellets having diameters up to 4 centimeters being especially preferred. The second way to achieve the low pressure drop is to use a low linear velocity of the gas through the bed. This also reduces the frictional drag of the gases on the pellets. To lower the velocity, a large diameter de-tarring vessel may be used. The third expedient for achieving low pressure drop is to make the packed bed as shallow as possible. These variables must, of course, be balanced by the requirement that the de-tarring vessel needs to hold enough solids to capture as much as possible of the tar forming species for the duration of at least one CVI processing cycle.

The use of a fluidized bed reactor for scrubbing tar formers from the effluent gas is possible. However, with this approach, fine particulates of iron ore must be used to meet the low pressure drop requirement. Also, fluid beds involve grinding and dust generation. Entrained dust causes excess wear on vacuum pumps.

DE-TARRING. The bed packed with iron ore pellets is heated at the same time as the CVI reactor, with some of the heat coming from the CVI reactor effluent gas. Once processing gas 3 starts to flow, the first gas to reach the packed bed contacts fresh iron oxide. The carbon-bearing gas species proceed to react with the surface oxide as per the following reactions:

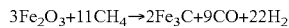

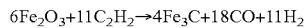

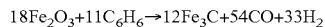

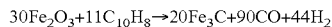

Once the surface is carbided, the process gases diffuse into the interior of the ore pellet through micro-channels. However, the fastest diffusing molecule in this chemical system is hydrogen, so the interior oxide will be reduced to sub-oxides and metallic iron before it is carbided. Reduction of iron oxide with hydrogen is well known:

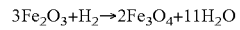

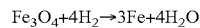

At temperatures above 600° C., FeO is present in the system, but it is omitted here for purposes of simplicity. The diffusion of water from the pellet's interior will inhibit carbiding by locally raising the oxygen potential on the pellet's surface. Water vapor entering the gas stream will destroy tar forming molecules, for example:

$$6H_2O+C_6H_6 \rightarrow 6CO+9H_2$$

Figure 2:
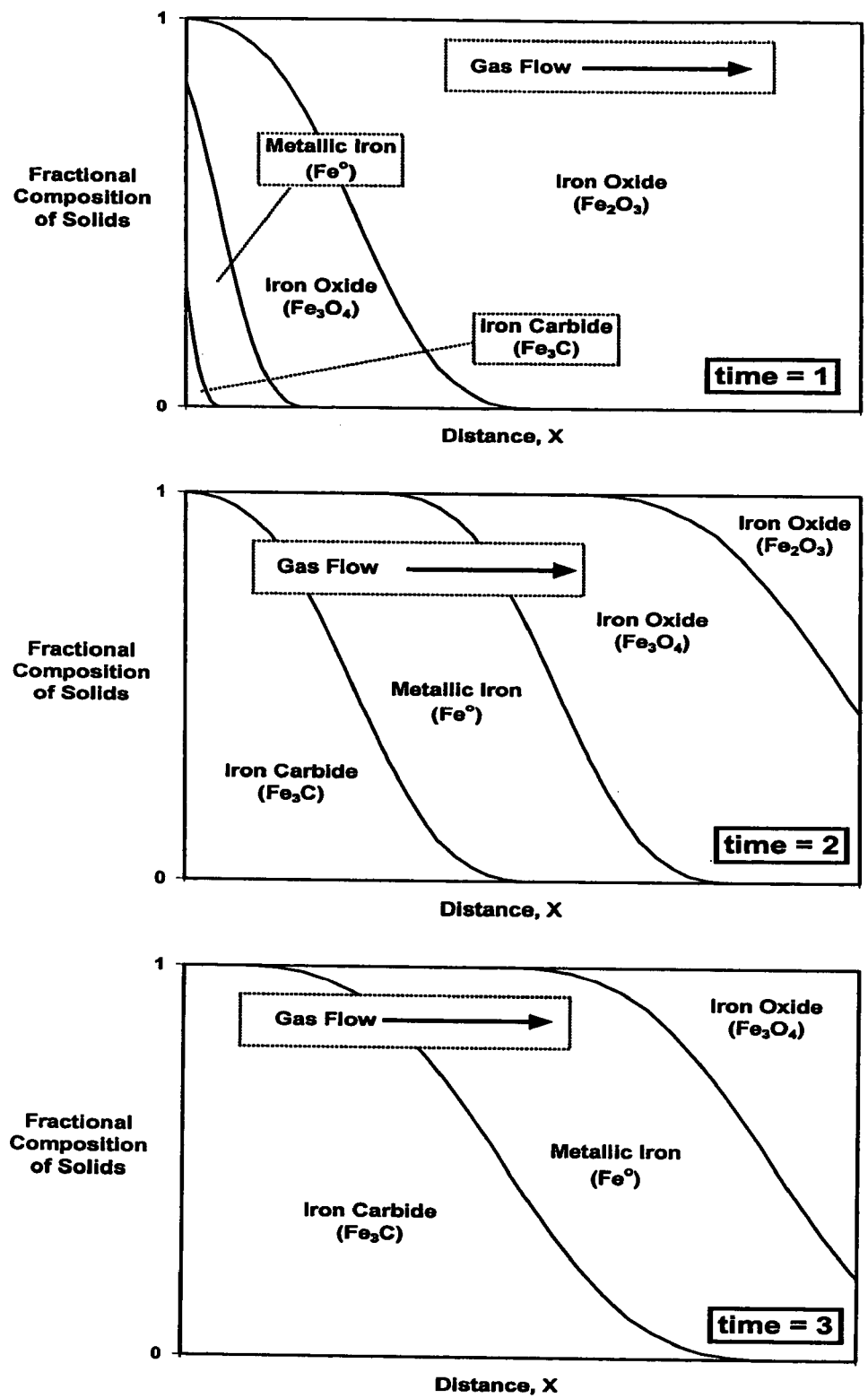
FIG. 2 shows reactant profiles at three different times after commencement of operation of the process of this invention.

FIG. 2. During a carbon-carbon processing cycle, the progression of reaction of the packed bed or iron ore will proceed as schematically illustrated in FIG. 2. The three plots shown in FIG. 2 represent increasingly longer elapsed times, with the top drawing (time=1) being shortly after the start of reaction. The middle and bottom drawings represent later stages in the reaction, with "time=3" being near the end of the useful life of the packed bed. The unreacted bed of hematite (Fe$_2$O$_3$) is first converted to magnetite (Fe$_3$O$_4$) by the reaction:

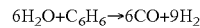

As time proceeds, more and more of the packed bed is converted, and an S-shaped concentration profile, or reaction wave, will move toward the exhaust end of the bed (the top in FIG. 1). Simultaneously, the fresh incoming effluent gas reduces the magnetite to metallic iron by the reaction:

$$Fe_3O_4+4H_2 \rightarrow 3Fe+4H_2O$$

That "reaction wave" also moves through the bed, following the hematite to magnetite wave. Finally, the metallic iron is carbided by the reaction:

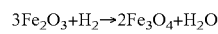

The exact shape of the "waves" depends on the reactivity of the system. Very rapid reactions will have more of a reaction "wall" shape with small "tails". Slow reactions will set up flat "waves". The de-tarring reactors in accordance with the present invention will generally have slow reaction kinetics, due to their use of large diameter particles, low temperatures, and high gas velocities. As the packed bed becomes fully carbided, unreacted gas will break through the bed. In accordance with this invention, gas treatment will generally be halted before the gas breaks through. The compositional profile at the end of a carbon-carbon processing cycle in accordance with this invention will resemble that shown at the bottom of FIG. 2 (time=3).

Returning to FIG. 1, at the end of the CVI processing cycle, the lower part of the packed bed 7 will be carbided iron (Fe$_3$C). The midsection 8 of the packed bed will be mostly metallic iron (Fe). The top portion 9 of the packed bed would still be primarily magnetite (Fe$_3$O$_4$). When the pellets are removed, the carbide pellets are removed (and sold), while the rest of the pellets will be reused, along with added fresh iron ore or oxide pellets. Pellet manipulations may be accomplished in a variety of ways. One approach is to have two distinct de-tarring reactors stacked, such that the gases pass through the lower vessel first, then through the upper one. When the iron carbide is removed from the lower vessel, the pellets in the upper vessel are moved to the lower vessel and fresh ore is charged into the upper vessel. In a variant of this approach, the lower packed bed is located inside the CVI reactor, between the carbon-carbon working zone and the exhaust port 6. In this variant, fully reduced iron pellets are preferred for placement inside the CVI reaction, in order to prevent the formation of carbon monoxide gas near the product being treated.

Another option for this invention is the use of directly reduced iron instead of iron ore. This has the advantage of completely removing the carbon from the gas stream to produce a hydrogen-only gas stream. This separates the carbon for eventual sequestration and generates hydrogen that can be used, for instance, in hydrogen fuel cells. The use of directly reduced iron simplifies the handling of the bed pellets, since there will be no oxide-containing pellets.

EXAMPLES

Tables IIa and IIb show Examples A, B, C, and D. Examples A and B use iron ore pellets. Examples C and D use metallic iron pellets.

TABLE IIa

| Example | A | B |
|---|---|---|
| Packed Bed properties | | |
| Iron type | Iron oxide | Iron oxide |
| Temperature | 600° C. | 700° C. |
| CVI Reactor effluent concentration, weight % | | |
| Methane | 78.6 | 55.7 |
| Molecular hydrogen | 7.4 | 15.7 |
| Tar formers | 14.0 | 28.6 |
| $H_2/C$ molar ratio | 2.3 | 2.8 |
| Pressure | 0.01 atm | 0.01 atm |
| Equilibrium results | | |
| Reduction in tar formers | Iron carbide produced per effluent gas treated, weight basis | |
| 50% | 0.20 | 0.40 |
| 95% | 0.45 | 0.90 |
| Reduction in tar formers | Concentration of carbon monoxide in product stream, volume % | |
| 50% | 5% | 7% |
| 95% | 11% | 15% |
| Reduction in tar formers | $CH_4/H_2$ molar ratio in product stream | |
| 50% | 1.16 | 0.40 |
| 95% | 0.93 | 0.29 |

TABLE IIb

| Example | C | D |
|---|---|---|
| Packed Bed properties | | |
| Iron type | Metallic | Metallic |
| Temperature | 600° C. | 700° C. |
| CVI Reactor effluent concentration, weight % | | |
| Methane | 78.6 | 71 |
| Molecular hydrogen | 7.4 | 25 |
| Tar formers | 14.0 | 4 |
| $H_2/C$ molar ratio | 2.3 | 4.6 |
| Pressure | 0.01 atm | 0.01 atm |
| Equilibrium results | | |

TABLE IIb-continued

| Example | C | D |
|---|---|---|
| Reduction in tar formers | Iron carbide produced per effluent gas treated, weight basis | |
| 50% | 1.0 | 0.67 |
| 95% | 2.4 | 2.6 |
| Reduction in tar formers | $CH_4/H_2$ molar ratio in product stream | |
| 50% | 1.25 | 0.32 |
| 95% | 1.00 | 0.22 |

DISCUSSION. Examples A and C have the same gas composition. Examples B and D have high and low levels of tar formers, respectively. Example D uses an effluent gas with a high hydrogen content. The equilibrium calculations show that the amount of carbide produced when 50% of the tar formers are removed from the gas stream varies from 0.2 to 1.0 kg of carbide per kg of treated gas. More tar-forming gases are consumed when oxides are carbided than when elemental iron is carbided. Much of the carbon in the tar-forming molecules is consumed to produce carbon monoxide. Example B, with twice the tar-forming species as Example A, produces twice the amount of iron carbide. For 95% removal of tar formers, both Examples C and D produce about 2.5 tons of carbide per ton of effluent treated. However because the starting levels of tar formers are significantly different for these two examples, the absolute levels of tar formers in the product gases are correspondingly different. In practice, an important goal may often focus on achieving acceptable maximum amounts of tar formers left in the effluent gas, rather than focusing on the percentage of tar formers removed from the gas. As demonstrated by the above Examples, this invention may be carried out to achieve a wide range of percentage reductions in tar formers. This aspect of the invention accordingly enables achievement of a wide range of desired maximum amounts of tar formers in CVD/CVI effluent gases.

To achieve a 95% reduction in tar formers, more than twice the amount of iron-containing solids is required compared to that needed for a 50% reduction. The production or iron carbide is linear with reduction in tar formers until near complete removal, at which point the removal tails off. The oxygen from the oxide ends up as carbon monoxide—there is essentially no water vapor or carbon dioxide. At 95% removal of tar formers, the level of carbon monoxide reaches 11% and 15% for Example A and B, respectively. As de-tarring proceeds, the ratio of methane to hydrogen decreases. This is caused not only by the release of hydrogen to the gas but also by consumption of methane to reduce oxide.

Figure 3:
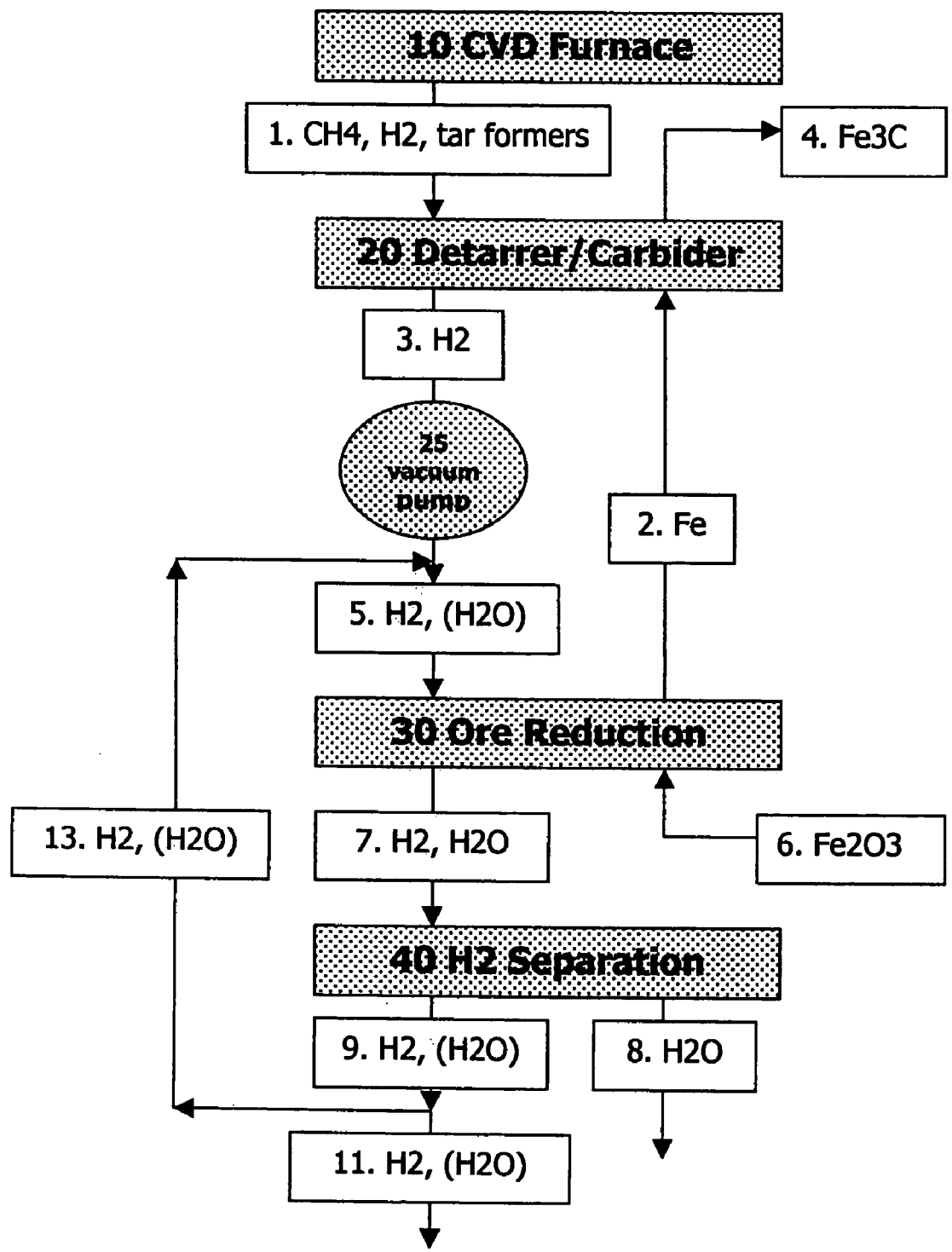
FIG. 3 is a process flow diagram illustrating the production of sequestered carbon in accordance with the present invention.

FIG. 3 features:
CVD/CVI step
de-tarring/carbiding step
vacuum pumping
ore reduction step
hydrogen separation step.

FIG. 3. Complete separation of the carbon-containing gases for sequestration can be achieved by using all of the methane to carbide sponge iron. In FIG. 3, sponge iron is used in the de-tar/carbider reactor not only to de-tar the effluent gas stream but also to completely convert the methane to iron carbide and hydrogen. Table III lists mass balances for process streams labeled as 1-9, 11, and 13 in FIG. 3. Examples C and D in Table III are the same as Examples C and D in Table IIb, but in Table III the gas stream is completely "de-carbonized" instead of just having tar formers removed as shown in Table IIb. The hydrogen and carbon are essentially completely separated into different streams. Equilibrium thermodynamic calculations indicate that the concentration of methane in the stream leaving the carbider is 0.8% and 0.2% for Examples C and D, respectively.

TABLE III

| Stream number | Component | Weight of components, metric tons | |
|---|---|---|---|
| | | Example C | Example D |
| 1 | $CH_4$, $H_2$, tar formers | 1 | 1 |
| 2 | $Fe_3C$ | 10.7 | 8.5 |
| 3 | $H_2$ ($H_2O$) | 0.3 | 0.4 |
| 4 | Metallic iron | 10.0 | 7.9 |
| 5 | $H_2$ ($H_2O$) | — | 1.8 (0.04) |
| 6 | $Fe_2O_3$ | — | 11.4 |
| 7 | $H_2$ ($H_2O$) | — | 1.4, 3.9 |
| 8 | Water | — | 3.8 |
| 9 | $H_2$ ($H_2O$) | — | 1.4 (0.04) |
| 11 | $H_2$ ($H_2O$) | — | 0.004 (nil) |
| 13 | $H_2$ ($H_2O$) | — | 1.4 (0.04) |
| Ore reduction temperature/pressure, C/atm | | | 600/1 |
| $H_2$ separation efficiency of water removal | | | 99.0% |

In example D, pure hydrogen is used to reduce the iron ore. Stream 3 is brought up to 1 atm or higher pressure through the vacuum pumps 25 and is combined with a recycle stream 13. This is required for complete reduction of the ore to metallic iron. For instance, at 600° C. 3.2 moles of hydrogen are required to produce 1 mole of water from the reduction of magnetite to metallic iron. At higher temperatures, less than 3.2 moles are required, and at lower temperatures, more than 3.2 moles are required. The hydrogen may be recovered for recycle using a hydrogen separation unit 40. The separation unit may be, for instance, a condenser or a membrane separation unit.

The effluent gas 1 used in Example C does not contain enough hydrogen to reduce all of the ore that is carbided. Therefore, no weights are listed in Table III for streams 5 through 9, 11, and 13. Example D uses effluent gas that has sufficient hydrogen to reduce the ore. In fact, in Example D the final product is only iron carbide and water. There is effectively no hydrogen in exhaust stream 11. For both examples, one metric ton of effluent gas carbide significant amounts of iron—10 and 7.9 metric tons or iron for Examples C and D, respectively.

What is claimed is:

1. A process for removing tar-forming hydrocarbons from an effluent gas mixture which comprises the step of passing at an elevated temperature an effluent gas mixture containing hydrogen, methane, and high molecular weight hydrocarbons, wherein said gas mixture is an effluent from a Chemical Vapor Deposition process or from a Chemical Vapor Infiltration process, through a first bed that contains iron pellets, thereby decomposing tar-forming high molecular weight hydrocarbons in said gas mixture.

2. The process of claim 1, wherein said Chemical Vapor Deposition (CVD) process or Chemical Vapor Infiltration (CVI) process deposits carbon in a fibrous matrix.

3. The process of claim 2, wherein said fibrous matrix comprises pitch and/or polyacrylonitrile derived carbon fibers.

4. The process of claim 3, wherein the carbonized fibrous matrix is a carbon-carbon composite configured as an aircraft brake disc.

5. The process of claim 1, comprising the further step of passing, at an elevated temperature, the gas mixture in which tar-forming high molecular weight hydrocarbons have been decomposed through a second bed that contains iron pellets, thereby decomposing tar-forming high molecular weight hydrocarbons remaining in said gas mixture.

6. The process of claim 5, wherein said first bed is located inside the CVI reactor, between the carbon-carbon working zone and the exhaust port.

7. The process of claim 1, wherein said elevated temperature is in the range 4000° C. through 11000° C.

8. The process of claim 7, wherein said elevated temperature is approximately 6000° C.

9. The process of claim 1, wherein said gas mixture contains 25 or less weight-% hydrogen, 50 or less weight-% methane, and 3 to 30 weight-% tar-forming high molecular weight hydrocarbons.

10. The process of claim 9, wherein the ratio of hydrogen gas to carbon in said gas mixture ranges from 2:1 through 5:1.

11. The process of claim 1, wherein said iron pellets comprise iron oxide or metallic iron.

12. The process of claim 11, wherein the diameters of said iron pellets range from 1 to 10 centimeters.

13. The process of claim 12, wherein the diameters of said iron pellets range from 1 to 4 centimeters.

14. A process which comprises the steps of:
providing a fibrous matrix that comprises pitch and/or polyacrylonitrile derived carbon fibers;
subjecting said fibrous matrix to Chemical Vapor Deposition (CVD) or Chemical Vapor Infiltration (CVI) to deposit carbon in said fibrous matrix by passing a gas mixture through said fibrous matrix, and recovering an effluent gas mixture containing hydrogen, methane, and high molecular weight hydrocarbons from the CVD/CVI processing; and
passing the effluent gas mixture at an elevated temperature through a first bed that contains iron pellets, thereby decomposing tar-forming high molecular weight hydrocarbons in said gas mixture.

15. A process which comprises the steps of:
providing a fibrous matrix that comprises pitch and/or polyacrylonitrile derived carbon fibers;
subjecting said fibrous matrix to Chemical Vapor Deposition (CVD) or Chemical Vapor Infiltration (CVI) to deposit carbon in said fibrous matrix by passing a gas mixture through said fibrous matrix, and recovering an effluent gas mixture containing hydrogen, methane, and high molecular weight hydrocarbons from the CVD/CVI processing;
passing the effluent gas mixture at an elevated temperature through a first bed that contains iron pellets, thereby decomposing tar-forming high molecular weight hydrocarbons in said gas mixture; and
passing, at an elevated temperature, the gas mixture in which tar-forming high molecular weight hydrocarbons have been decomposed through a second bed that contains iron pellets, thereby decomposing tar-forming high molecular weight hydrocarbons remaining in said gas mixture.

* * * * *